United States Patent
Newman et al.

(10) Patent No.: US 12,112,131 B2
(45) Date of Patent: Oct. 8, 2024

(54) SYSTEMS AND METHODS FOR FACTUAL EXTRACTION FROM LANGUAGE MODEL

(71) Applicant: Salesforce, Inc., San Francisco, CA (US)

(72) Inventors: Benjamin Newman, Great Neck, NY (US); Nazneen Rajani, Mountain View, CA (US); Prafulla Kumar Choubey, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 462 days.

(21) Appl. No.: 17/588,043

(22) Filed: Jan. 28, 2022

(65) Prior Publication Data

US 2023/0083512 A1    Mar. 16, 2023

Related U.S. Application Data

(60) Provisional application No. 63/242,862, filed on Sep. 10, 2021.

(51) Int. Cl.
| | | |
|---|---|---|
| *G06F 40/30* | (2020.01) | |
| *G06F 3/08* | (2006.01) | |
| *G06F 40/126* | (2020.01) | |
| *G06F 40/279* | (2020.01) | |
| *G06N 3/044* | (2023.01) | |

(52) U.S. Cl.
CPC .......... *G06F 40/279* (2020.01); *G06F 40/126* (2020.01); *G06N 3/044* (2023.01)

(58) Field of Classification Search
CPC .......... G06F 40/58; G06F 40/44; G06F 40/45; G06F 40/47; G06N 3/08
See application file for complete search history.

(56) References Cited

U.S. PATENT DOCUMENTS

| | | | |
|---|---|---|---|
| 9,754,219 B1 * | 9/2017 | Brestoff | G06N 20/00 |
| 2010/0150448 A1 * | 6/2010 | Lecerf | G06F 18/253 |
| | | | 382/190 |

(Continued)

FOREIGN PATENT DOCUMENTS

CN    110929515 A  *   3/2020  .......... G06N 3/0445

OTHER PUBLICATIONS

CN 110929515A, pp. 1-13 (Year: 2020).*
Huaichao et al., Translation of CN 110929515, China Patents Fulltext, Â © Publisher specific, pp. 1-17 (Year: 2020).*

*Primary Examiner* — Lamont M Spooner
(74) *Attorney, Agent, or Firm* — Haynes and Boone, LLP

(57) ABSTRACT

Embodiments described herein provide a system and method for extracting factual information. The system transforms a query into a natural language prompt in a format of a query subject and a queried relation. The system encodes, via an embedding layer of a pre-trained language model, the natural language prompt into a first embedding. The system encodes, via the adapter model, the first embedding into a second embedding based on a probability that the second embedding returns the factual information when the second embedding is fed the first attention layer of the pre-trained language model. The system decodes, by the first attention layer of the pre-trained language mode, the second embedding into a response to the query. The system extracts the factual information from the decoded response to the query.

20 Claims, 11 Drawing Sheets

(56) References Cited

U.S. PATENT DOCUMENTS

| | | | |
|---|---|---|---|
| 2020/0218781 A1* | 7/2020 | Takano | G06Q 30/016 |
| 2021/0082424 A1* | 3/2021 | Johnson | G10L 15/063 |
| 2021/0089924 A1* | 3/2021 | Kruus | G06N 3/043 |
| 2021/0109958 A1* | 4/2021 | Behtash | G06F 18/214 |
| 2021/0182020 A1* | 6/2021 | Kanuganti | G06F 3/167 |
| 2021/0406476 A1* | 12/2021 | Pan | G06N 20/00 |
| 2021/0406706 A1* | 12/2021 | Hasan | G06F 40/284 |
| 2021/0406735 A1* | 12/2021 | Nahamoo | G06F 40/30 |
| 2022/0012633 A1* | 1/2022 | Molahalli | H04L 41/50 |
| 2022/0067077 A1* | 3/2022 | Tupakula | G06F 16/345 |
| 2022/0092099 A1* | 3/2022 | Bae | G06N 3/08 |
| 2022/0094713 A1* | 3/2022 | Lee | G06F 18/214 |
| 2022/0129636 A1* | 4/2022 | Baughman | G06F 16/248 |
| 2022/0207384 A1* | 6/2022 | Florian | G06F 40/169 |
| 2022/0300544 A1* | 9/2022 | Potter | G06N 3/088 |
| 2022/0335219 A1* | 10/2022 | Sengupta | G06N 3/042 |
| 2022/0382965 A1* | 12/2022 | Li | G06F 40/166 |
| 2022/0398384 A1* | 12/2022 | Wang | G06F 40/126 |

* cited by examiner

| Metric | P-Adapter | ID | OOD Prompts | OOD Objects | OOD KE |
|---|---|---|---|---|---|
| P@0.01 | Baseline | 0.157 | 0.157 | 0.009 | 0.092 |
| | Rewrite | 0.288 ± 0.00 | 0.247 ± 0.00 | 0.078 ± 0.00 | 0.167 ± 0.00 |
| | Prefix | 0.416 ± 0.01 | 0.407 ± 0.01 | 0.192 ± 0.00 | 0.320 ± 0.01 |
| | P-Tuning | 0.442 ± 0.00 | 0.422 ± 0.00 | 0.203 ± 0.00 | 0.325 ± 0.00 |
| | MoE | 0.488 ± 0.00 | 0.418 ± 0.00 | 0.233 ± 0.01 | 0.330 ± 0.00 |
| | Oracle | 0.496 ± 0.01 | 0.496 ± 0.01 | 0.238 ± 0.02 | 0.496 ± 0.01 |
| Consistency | Baseline | 0.126 | 0.133 | 0.097 | 0.068 |
| | Rewrite | 0.478 ± 0.01 | 0.448 ± 0.02 | 0.456 ± 0.01 | 0.223 ± 0.01 |
| | Prefix | 0.620 ± 0.00 | 0.591 ± 0.01 | 0.572 ± 0.02 | 0.437 ± 0.02 |
| | P-Tuning | 0.720 ± 0.00 | 0.646 ± 0.01 | 0.656 ± 0.01 | 0.476 ± 0.01 |
| | MoE | 0.853 ± 0.02 | 0.664 ± 0.02 | 0.925 ± 0.03 | 0.441 ± 0.01 |
| | Oracle | 1.000 ± 0.00 | 1.000 ± 0.00 | 1.000 ± 0.00 | 1.000 ± 0.00 |

FIG. 9

SYSTEMS AND METHODS FOR FACTUAL EXTRACTION FROM LANGUAGE MODEL

CROSS REFERENCE(S)

The present disclosure claims priority the U.S. Provisional Application No. 63/242,862, filed on Sep. 10, 2021, which is hereby expressly incorporated by reference herein in its entirety.

TECHNICAL FIELD

The embodiments relate generally to machine learning systems, and more specifically to a mechanism for extracting information from a pre-trained language model.

BACKGROUND

Language models are on an exponential growth path, with bigger and bigger models. Large language models are being made better by increasing the number of parameters in the model from millions to billions and now trillions. Training language models is resource intensive because of the sheer number of parameters. Moreover, language models are not trained for factual knowledge extraction. Therefore, the response from the language model to a query for factual knowledge may vary based on the query.

Therefore, there is a need to provide a factual information extraction system that provides consistent response without retraining the language model.

BRIEF DESCRIPTION OF THE DRAWINGS

FIGS. 9-11 provide various data tables and plots illustrating example performance of the factual information extraction system and/or method described in FIGS. 1-8, according to one embodiment described herein.

Figure 1:
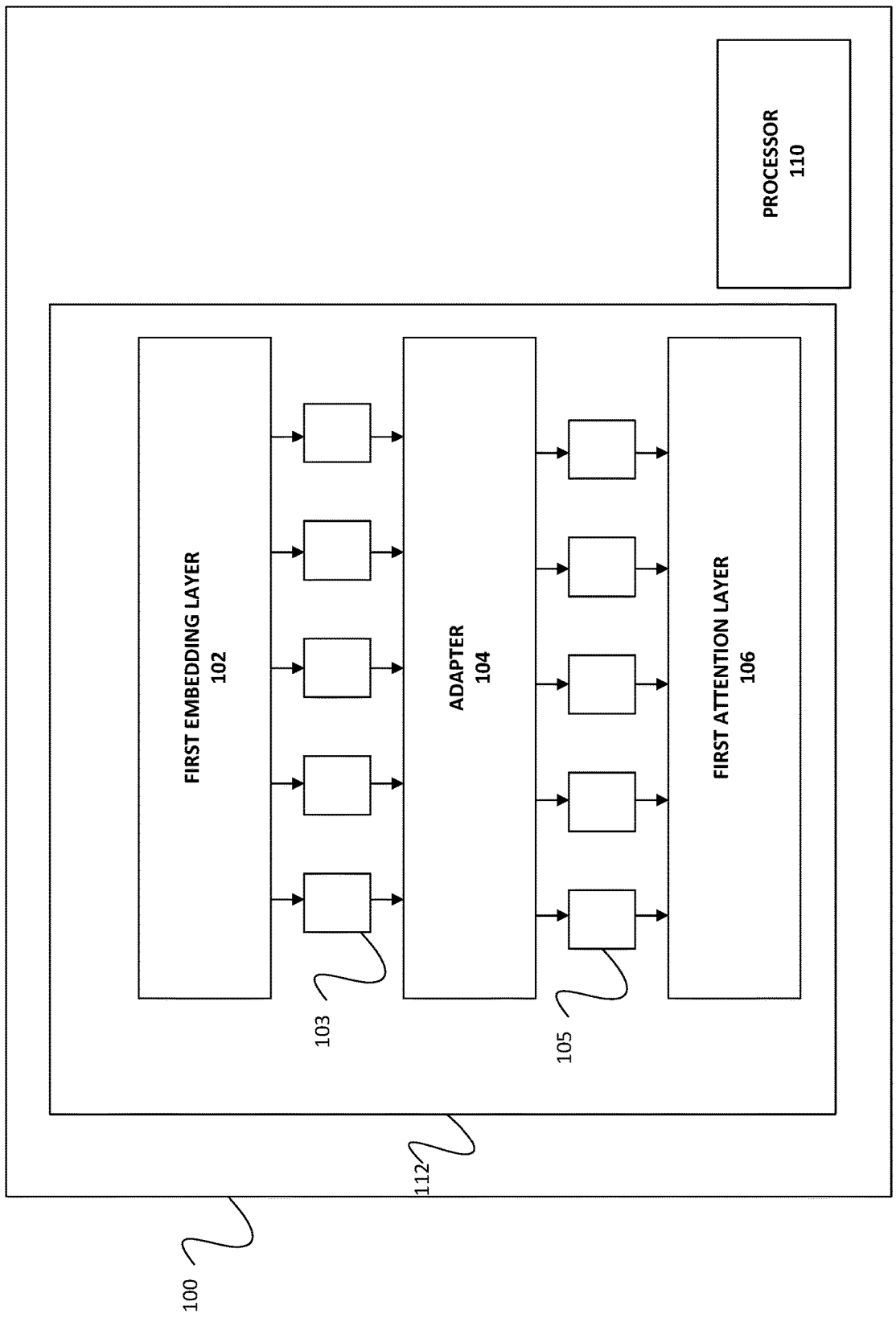
FIG. 1 is a simplified diagram illustrating an example architecture for extracting factual information from a language model, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

A language model provides a probability of a given sequence of words occurring in a sentence. In an example, a system may train a language model using statistical and probabilistic techniques on a training dataset. Once trained the language model may provide a probability that a given sequence of words in a sentence is valid. The trained language model may be used for machine translation, question answering and the like.

As used herein, the term "factual information" may refer to information that concerns facts such as the capital of states, the name of a president or the cardinality of an order of information and the like. In an example, the term factual information may be contrasted with inferential information, which is derived from another piece of information. For example, the capital of United States is Washington DC In an example, in response to the query, "What is the capital of United States?" The response "Washington DC" is factual information, i.e., Washington DC In an example, a language model may be pre-trained on a large set of documents.

As used herein, a knowledge base is a large collection of knowledge data comprising objects information and relationship information between the objects. Such knowledge base may often be searched to provide an answer to a query.

Large language models such as the BERT, GPT, Gopher and the like are computationally expensive to train. Extracting factual information from such large language models using a natural language query can often be inconsistent, e.g., when the ordering of words in the natural language query varies. Existing large language models produce variable output to a query based on the way a query is phrased. For example, a user may draft a natural language query, "The capital of America is [Mask]." Another user may draft the same query as, "America, which has the capital city [Mask]." Existing language models may generate inconsistent responses to these two queries because of the variability in the structure of the query, while responses to these two queries shall be the same despite the different query structures. In some situations, for an existing language model to generate accurate and consistent responses to such queries, the language model needs to be re-trained with a dataset containing different query structures, which incurs further computational overhead to the system.

In view of the consistency issue in question and answering, embodiments provide a factual information extraction framework that is built upon a pre-trained language model and an additional adapter model placed between an embedding layer that produces a first embedding and an attention layer of the pre-trained language model. The adapter model then produces a second encoding based on the output of the embedding layer of the pre-trained language model to. The second encoding is then used to query the pre-trained language model using a continuous representation and retrieve factual information, which aims at maximizing the probability that the pre-trained language model will produce a consistent response to the natural language query irrespective of the ordering of the words in the natural language query.

In this way, the adapter model improves the accuracy of natural language query without retraining the large language model which is computationally intensive.

The system described herein provides a method for training an adapter that interfaces between a first embedding layer of a pre-trained language model and a first attention layer of a pre-trained language model to transform the natural language prompts into a continuous representation, that reduces the variability of the pre-trained language model in response to a query.

The system receives via a communication interface, a query for factual information. The system transforms the query into a natural language query that includes a query subject and a query relationship. In an example, the query relationship relates the query subject to a query object that may be masked. The system encodes the natural language query, via a first embedding layer of the pre-trained language model, into a first embedding. The system encodes via the adapter model, the first embedding into a second embedding that includes a continuous representation. In an example, the adapter model determines the continuous representation based on a probability that the continuous embedding returns the factual information when the second embedding is fed to the first attention layer of the pre-trained language model. The system decodes, via the first attention layer of the pre-trained language model, the second embedding into a response to the query. The system extracts the factual information from the decoded response to the query. For example, the system extracts the factual information based on a query object in the response to the query that was not part of the query.

The adapter model provides a continuous representation to the pre-trained language model instead of a single optimal prompt in prior systems to address the variability of the pre-trained language model. This improves the adaptability of the pre-trained language model to queries without retraining the pre-trained language model. Moreover, the adapter model provides a continuous representation to the pre-trained language model which allows natural language queries to be processed while reducing the variability of the output from the pre-trained language model without retraining the pre-trained language model which may be expensive to retrain in terms of Graphical Processing Unit or CPU processing time. Moreover, the data and methods used to train the pre-trained language model is often not available which makes retraining the pre-trained language model difficult. Additionally, the adapter model may be trained using fewer Graphical Processing Unit or CPU processing time.

FIG. 1 is a simplified diagram illustrating an example architecture for extracting factual information from a language model, according to one embodiment described herein. As shown in FIG. 1, a system 100 include a processor 110 and a memory 112. In an example, the memory 112 may store one or more pre-trained language models. One of the pre-trained language models may comprise a first embedding layer 102, a first attention layer 106, and an adapter model 104 placed between the first embedding layer 102 and the first attention layer 106. In an example, the adapter model 104 takes as input a first embedding 103 from the first embedding layer 102 of the pre-trained language model and outputs a second embedding 105 such as a continuous prompt.

The system 100 receives, via a communication interface a query for factual information. The system 100 encodes via the pre-trained language model, the natural language prompt into a first embedding 103. For example, assume the system 100 receives via the communication interface 108 the following query: "Capital of America is". In an example, the system 100 determines the first embedding 103 for this query via the embedding layer 102 of the pre-trained language model. In an example, the first embedding 103 may be a vector representation of the query after normalization in an n-dimensional space. The adapter model 104 receives the first embedding 103 from the embedding layer 102. The adapter model 104 encodes the first embedding 103 into a second embedding 105. In an example, the second embedding 105 may be a continuous representation. In an example, the continuous representation is in a form that may be used as an input to a first attention layer 106 of the pre-trained language model in place of the first embedding 103. In an example, the second embedding 105 may be based on the probability that the second embedding returns the factual information consistently, precisely or both the factual information when the second embedding is fed to the first attention layer of the pre-trained language model.

In an example, the system 100 may decode via the first attention layer of the pre-trained language model, the second embedding 105 into a response to the query. The system 100 may extract the factual information from the decoded response to the query. In an example, the system 100 may decode via the first embedding layer of the pre-trained language model.

Examples of pre-trained language models include Transformers such as Bidirectional Encoder Representations from Transformers (BERT), Generative Pre-Trained Transformer and the like.

In an example, the adapter model 104 may be a p-adapter model, a mixture of experts adapter model or an oracle adapter model. For example, the p-adapter models may be trained to modify a natural language prompt to produce a second embedding.

In an example, the system 100 may train the mixture of experts model or the oracle adapter model that produces a consistent output in response to a query based on mapping each prompt to a canonical prompt, and querying the language model with this prompt. In an example, in the mixture of experts model or the oracle model, the canonical prompt is a continuous prompt optimized for the relation between the entities in the natural language prompt. In an example, the mixture of experts model and the oracle adapter model may require additional annotations with the relation of the prompt to the subject and the object.

In an example, the system 100 may receive, via a communication interface, a training data set, the training dataset including a plurality of sets of similar natural language queries for factual information. The system 100 may determine a first entity and a second entity in each query in a set of similar natural language queries from the plurality of sets of similar natural language queries. The system 100 may mask at least the first entity or the second entity in each query in the set of similar natural language queries. The system 100 may determine a masked embedding for each masked query in the set of similar natural language queries. The system 100 may determine a response to each masked embedding via the pre-trained language model, via the first attention layer of the pre-trained language model. The system 100 may determine whether the response matches the masked entity in the natural language query. The system 100 may determine a probability that a masked embedding will return the response that matches the masked entity in the natural language query. The system 100 may update an adapter model 104 that chooses a query where the response from the pre-defined language model matches the masked entity based on the determined probability.

In an example, the system 100 may train different adapter models 104 with different parameters. For example, the system 100 may train p-adapters such that the function $f_{P-Adapter}$: $e(x') \to x'_{cont}$ is a rewrite p-adapter, a prefix p-adapter, or a p-tuning p-adapter. It will be understood by those skilled, in the art that these are exemplary p-adapters and other p-adapters may be trained based on different parameters.

For example, the different p-adapters my produce a different second embedding 103. In an example, the second embedding 105 has the same dimensions as the first embedding 103. In an example, the second embedding 105 has additional prefixes added to the first embedding 103. In an example, the second embedding 105 has the same parameters unchanged as the first embedding 103.

For example, the system 100 (shown in FIG. 1) may train the adapter model 104 (e.g., p-adapter model with reference to FIG. 2-5). In an example, the system 100 may train an adapter model 104 such as a P-adapter model that is described by the formula: $e(x')$. For example, the P-Adapter models take as input the embeddings of the natural language prompt, $e(x')$, and output a new sequence of continuous embeddings, $x'_{cont}$.

After training, the p-adapter model may receive as input the first embedding that corresponds to the natural language query $e(x')$ and output a continuous embedding $x'_{cont}$. The system 100 may determine the continuous embedding $x'_{cont}$ that may be substituted in place of the first embedding $e(x')$ as input the first attention layer 106.

In an example, the adapter model 104, (e.g., the p-adapter model) is described by the function $f_{P-Adapter}$: $e(x') \to x'_{cont}$, i.e., the p-adapter model returns the continuous embedding when it receives the first embedding. In an example, the system 100 trains the adapter model 104 (e.g., the p-adapter model) to maximize the probability $P_{LM}(y \uparrow x'_{cont})$. In other words, the adapter model 104 is trained to maximize the probability that the pre-trained language model will return the factual information y when the continuous embedding $x'_{cont}$ is used as an input to the pre-trained language model via the second embedding layer 106.

In an example, the system 100 via the adapter model 104 such as the p-adapter model may improve the predictions from the pre-trained language model which is described by the formula:

$$\arg\max_{v \in \mathcal{V}} P_{LM}(v|f_{prompt}(e(x'))),$$

where $\mathcal{V}$ is the pre-trained language model vocabulary.

Figure 2:
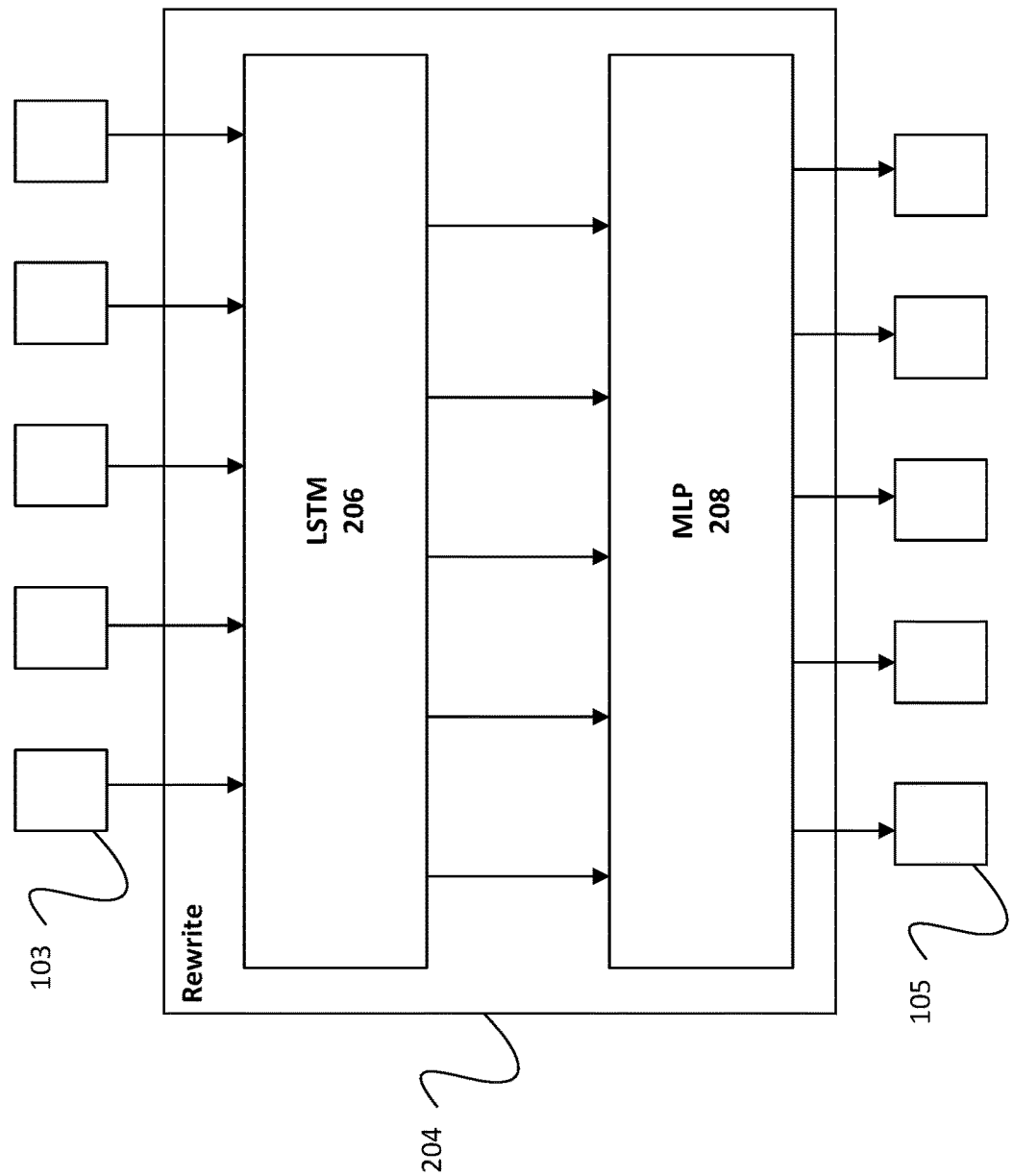
FIG. 2 is a simplified diagram of a rewrite p-adapter model for extracting factual information from a language model, according to one embodiment described herein.

FIG. 2 is a simplified diagram of a rewrite p-adapter model for extracting factual information from a language model, according to one embodiment. The system 100 may train a rewrite P-adapter 204 for the adapter model 204 (that is similar to the adapter model 104) that includes a Long Short-Term Memory network (LSTM) 206 and a set of Multi-Layer Perceptron (MLPs) 208. In an example, the rewrite P-adapter model 204 includes a LSTM 206 and an MLP 208 connected to each output of the LSTM 206 such that the MLP 208 connected to each output of the LSTM 206 processes the corresponding hidden state from the output of the LSTM 206. In an example, the LSTM 206 may be a bi-directional LSTM. In an example, the system 100 may train a rewrite P-adapter 204 that includes a 384-dimensional bidirectional LSTM 206 followed by a single MLP 208 applied to each hidden state of the bidirectional LSTM 206 independently. In an example, the rewrite p-adapter 204 may produce a second embedding 105 that has the same dimensions at the first embedding 103.

In an example, the Prefix adapter 204 may determine, via an LSTM 206 layer, an LSTM encoding in response to the first embedding 103. The prefix adapter 204 may determine, via a Multi-Layer Perceptron (MLP), the second embedding in response to the LSTM encoding.

Figure 3:
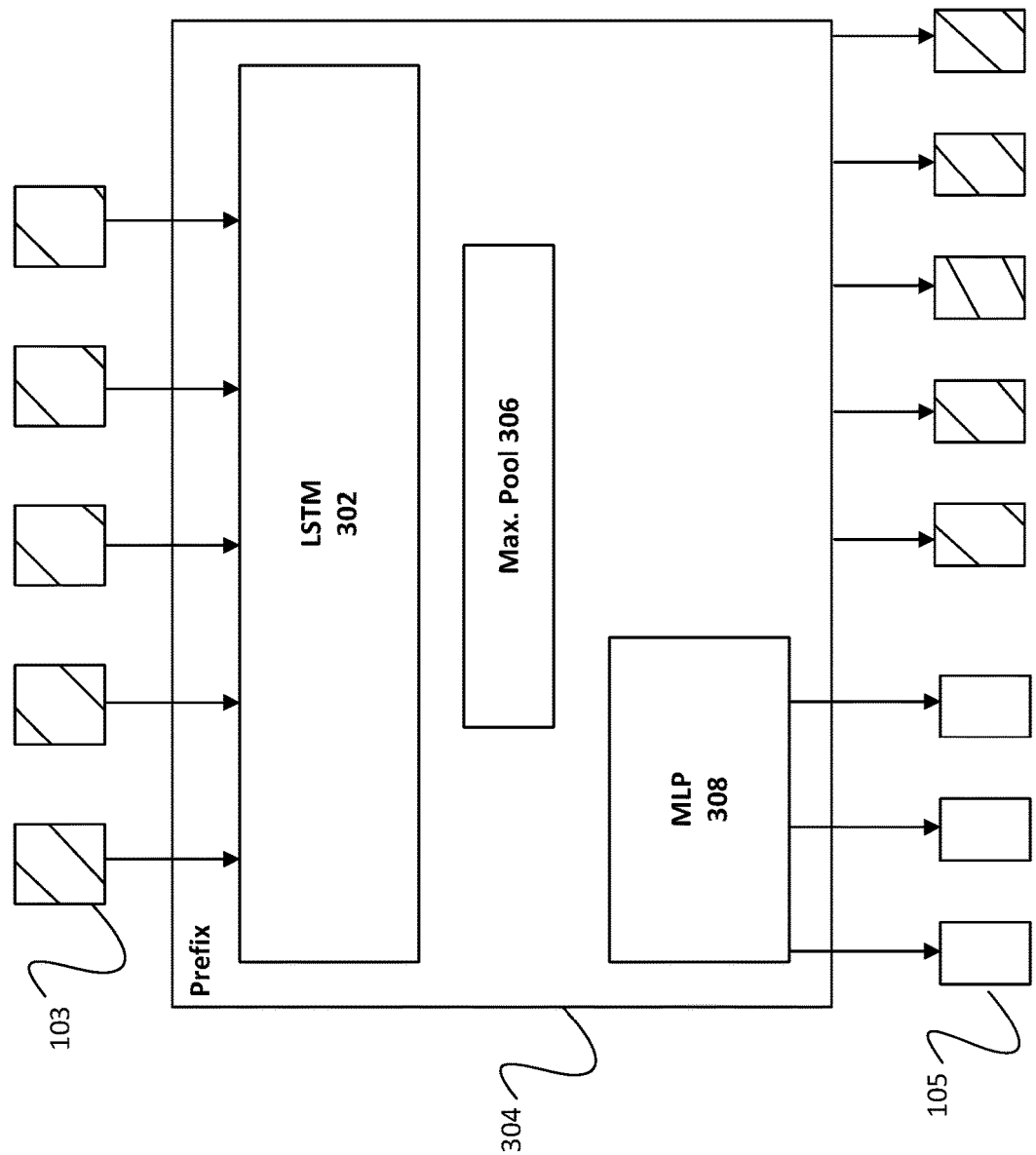
FIG. 3 is a simplified diagram of a prefix p-adapter model for extracting factual information from a language model, according to one embodiment described herein.

FIG. 3 is a simplified diagram of a prefix p-adapter model for extracting factual information from a language model, according to one embodiment. the system 100 may train a Prefix P-Adapter. In an example, the Prefix P-adapter may be parameterized similar to the Rewrite P-Adapter. In an example, the Prefix P-adapter includes an LSTM 302, a max pool layer 306 and an MLP 308. In an example, the LSTM 302 may be a bi-directional LSTM.

In an example, the pre-fix P-Adapter prepends the output of its MLP to the output, i. e., $e(x')$. In an example, the system 100 may determine a fixed length prefix. In an example, the system 100 may determine the prefix lengths based on the factual information to be extracted. For example, the system 100 may choose a prefix length of nine.

In an example, the system 100 may determine via the Prefix P-Adapter, the input to the language model as $$[g(e(x')); e(x')],$$

where g is the application of a Bi-LSTM, a max-pool, and an MLP. In an example, the system 100 can train a Prefix P-adapter such that the Prefix P-Adapter keeps all of the embeddings, i.e., $e(x')$ accessible to the first attention layer of the language model. In an example, the first embedding 103 is accessible along with the prefix at the first attention layer of the language model.

In an example, the Prefix adapter 204 may determine, via an LSTM 302 layer, an LSTM encoding based on the first embedding 103. The prefix adapter 204 may down-sample the LSTM output, via a pooling layer 306, and determine, via the MLP 308, a part of the second embedding based on the down-sampled LSTM encoding. In an example, the prefix adapter 204 may append the prefix to the first embedding 103 to generate the second embedding 105.

Figure 4:
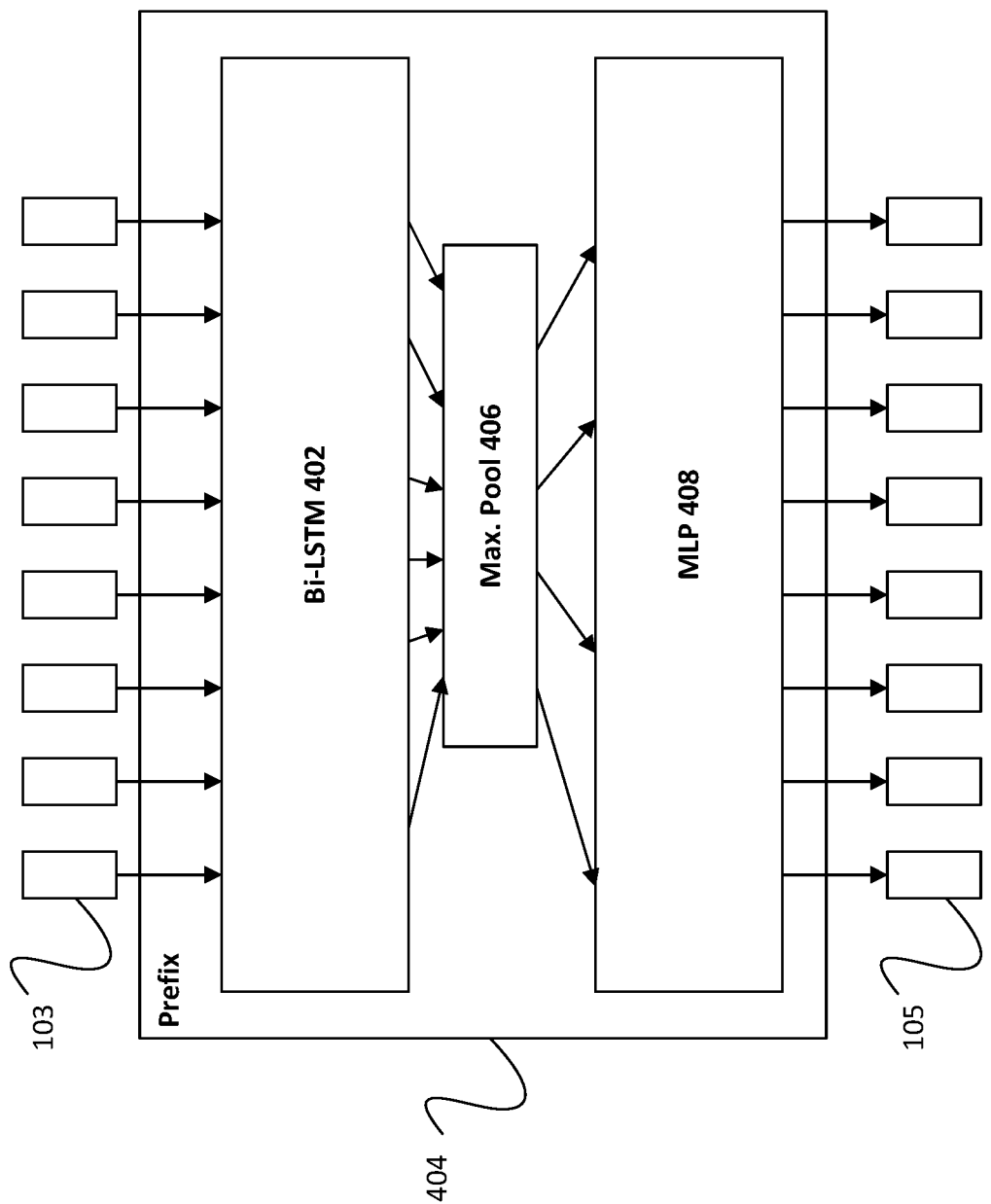
FIG. 4 is a simplified diagram of a p-tuning p-adapter model for extracting factual information from a language model, according to one embodiment described herein.

FIG. 4 is a simplified diagram of a p-tuning p-adapter model for extracting factual information from a language model, according to one embodiment The system 100 may train a P-Tuning P-Adapter. In an example, the P-Tuning P-adapter may be based on a P-Tuning method that learns a continuous prompt for each relation in a dataset such as the Language Model Analysis (LAMA) dataset. In an example, the system 100 trains the P-Tuning P-adapter to learn a function $g: r \to R^{d \times 9}$, where d is the hidden dimension of the Language Model. The second embedding of the P-Tuning P-adapter, i.e., $x'_{cont}$ consists of the output of g, the embedding of the subject, and the embedding of the mask token. In an example, the second embedding has the following form:

$$[g(r)_{[0:3]}; e(x); g(r)_{[3:6]}; e([MASK]); g(r)_{[6:9]}],$$

where bracket notation represents python-style indexing.

In an example, the P-Tuning P-Adapter may take as input x' via the learning function g and is parameterized similarly to the Prefix P-Adapter. In an example, similar to the Prefix P-Adapter, the system 100 may train the P-Tuning P-adapter to generate a fixed number of embeddings. In an example, the P-Tuning P-adapter may output the embeddings for the subject and [MASK] token unchanged, rather than outputting all the prefixes to the output, i.e., e(x'). In an example, the P-Tuning P-Adapter model may include annotations during training and inference compared to other P-Adapter models described herein above. In an example, the P-tuning Adapter model may require knowledge such as the identity of the subject.

In an example, the LSTM layer 402 receives a first embedding 103 from the embedding layer 102. The system 100 may determine via an LSTM layer 402, an LSTM encoding in response to a first embedding 103 from the embedding layer 102. The LSTM encoding may be sent through a Max pool layer 406 and an MLP 408. The system 100 may determine a second embedding.

Figure 5:
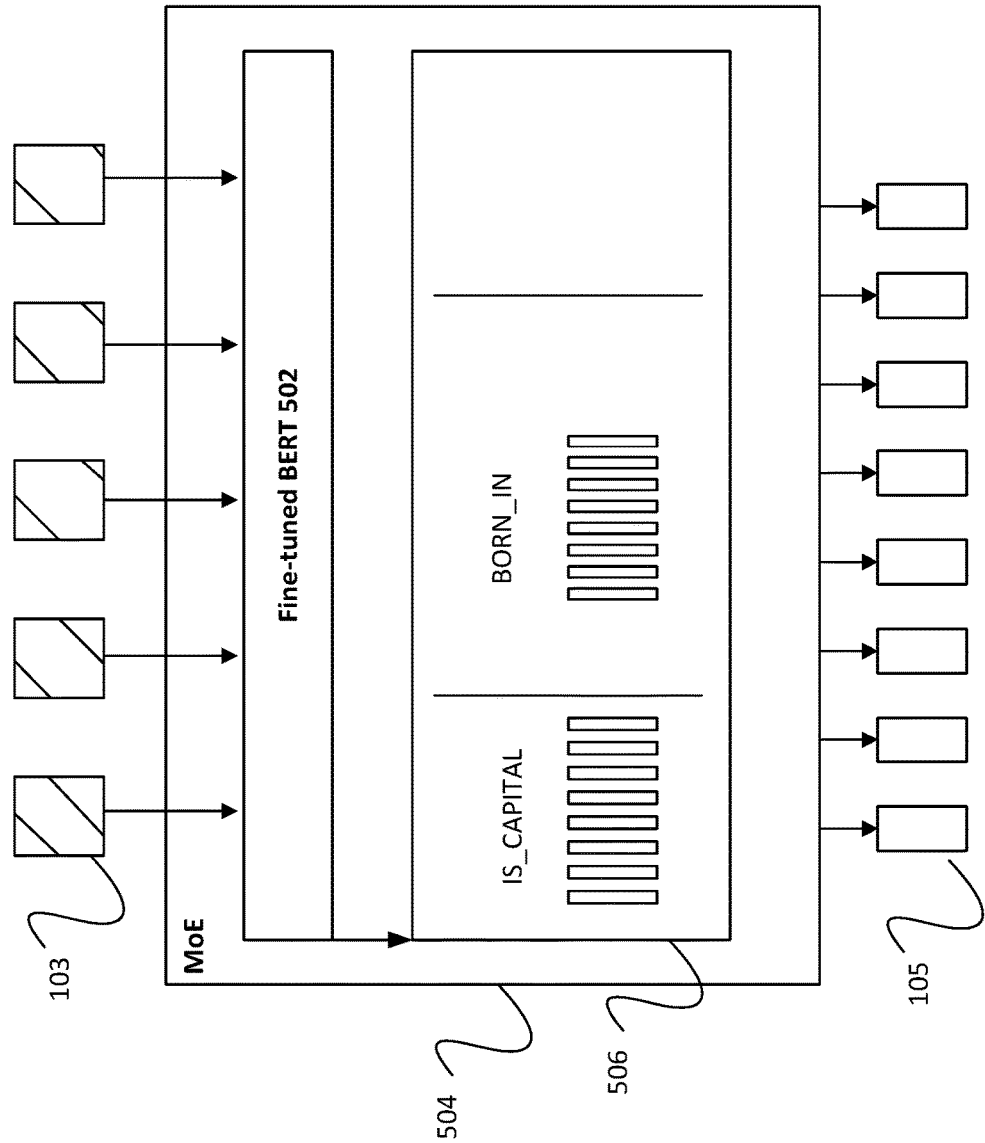
FIG. 5 is a simplified diagram of a Mixture of Experts adapter model for extracting factual information from a language model, according to one embodiment, according to some embodiments described herein.

FIG. 5 is a simplified diagram of a Mixture of Experts adapter model 504 for extracting factual information from a language model, according to one embodiment. In an example, the system 100 may train the Mixture of Experts (MoE) model 504 that includes a classifier 502 that predicts the relation between the entities of a natural language prompt and a look-up table 506 to map the predicted relations to the canonical continuous prompts. For example, the classifier 502 may be a BERT Base Cased model fine-tuned on a 41-way classification task. In an example, the system 100 may train the continuous prompts with P-Tuning based on the hyperparamters described herein above with reference to P-Tuning P-adapters with one prompt for each of the 41 relations.

In an example, the system 100 may train the mixture of experts such that the model does not use a weighted combination of prompts from different relations and instead just use the single prompt from the predicted relation.

In an example, the system 100 may determine a first entity and a second entity in the first embedding 103. The system 100 may determine, via a classifier, a relationship between the first entity and the second. The system 100 may determine, via a look-up table, the second embedding associated with the relationship.

Figure 6:
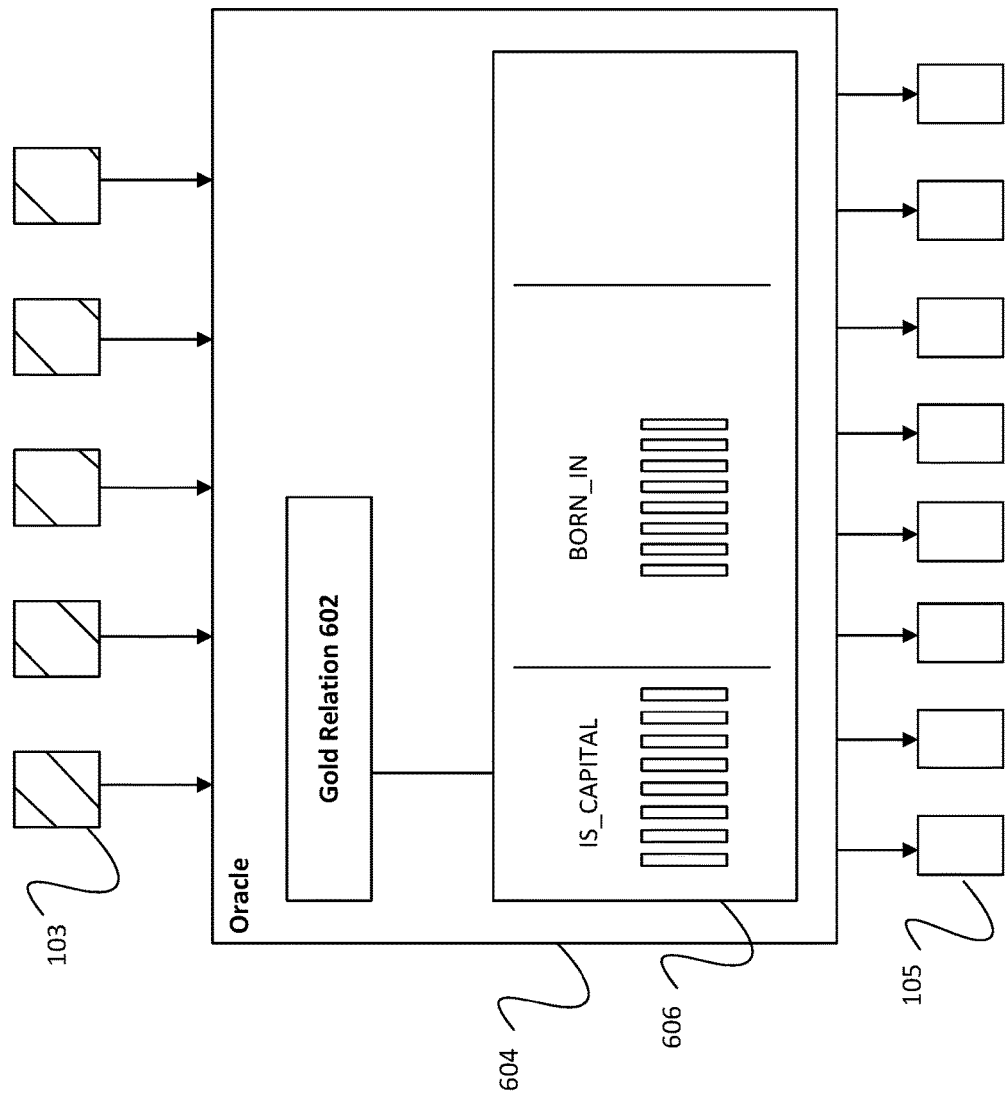
FIG. 6 is a simplified diagram of an Oracle adapter model for extracting factual information from a language model, according to one embodiment, described herein.

FIG. 6 is a simplified diagram of an Oracle adapter model 604 for extracting factual information from a language model, according to one embodiment.

In an example, the system 100 may train an Oracle adapter model 604 similar to the MoE adapter model 504 shown in FIG. 5. The Oracle adapter model 604 may include a gold relation 602 that predicts the relation at inference and a look-up table 606 to map the predicted relations to the canonical continuous prompt. In an example, the oracle adapter mode 604 may produce consistent output such that the same entity pair produces the same prediction.

In an example, the system 100 may determine a first entity and a second entity in the first embedding. The system 100 may determine, via a golden rule of the oracle model, a relationship between the first entity and the second entity, wherein the oracle model returns a relationship given the first entity and the second entity. The system 100 may determine, via a look-up table, the second embedding 105 associated with the relationship.

Computing Environment

Figure 7:
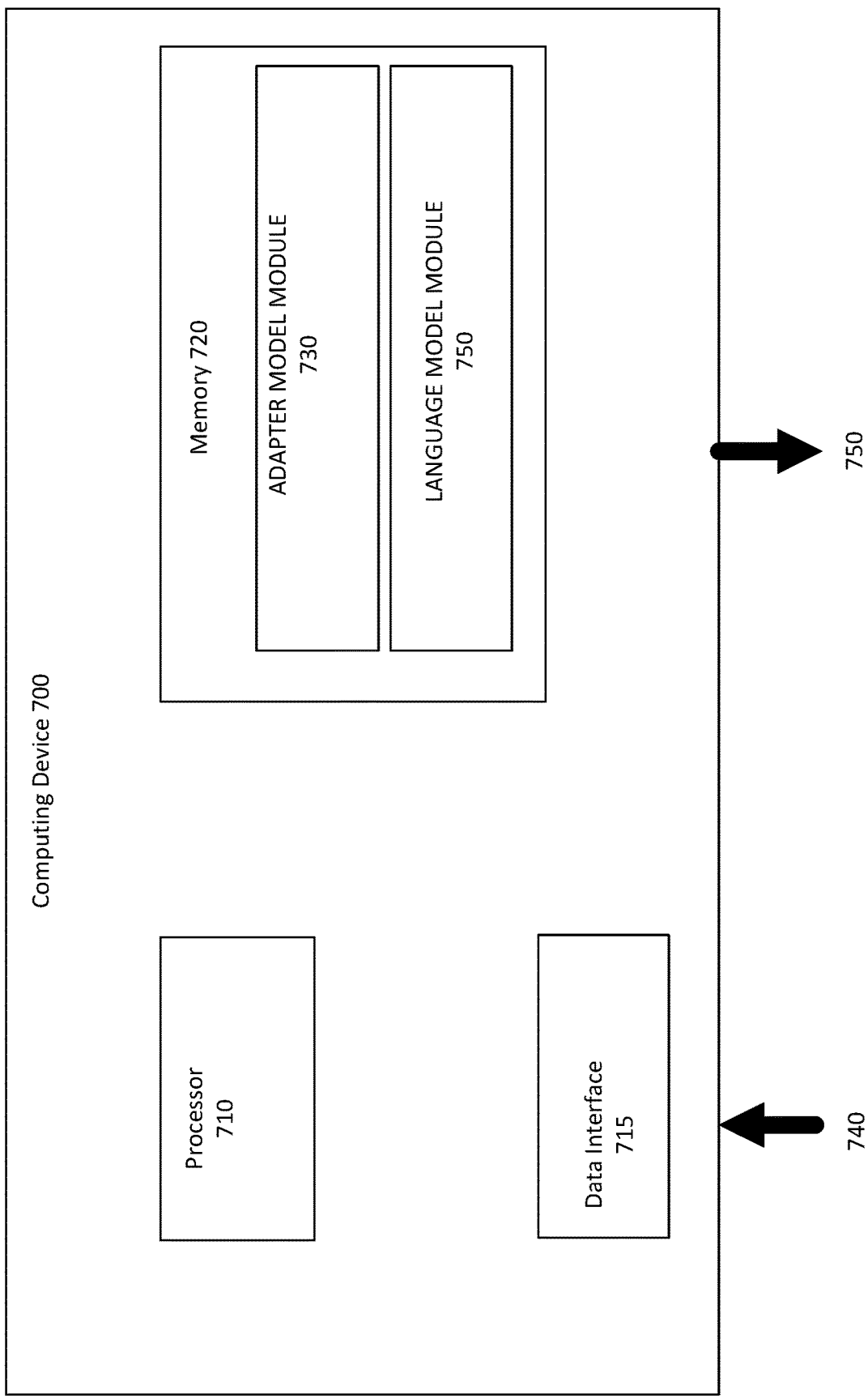
FIG. 7 is a simplified diagram of a computing device that implements the method for extracting factual information from a language model, according to some embodiments described herein.

FIG. 7 is a simplified diagram of a computing device that implements the training and use of an adapter model 104 for retrieving factual information from a language model, according to some embodiments described herein. As shown in FIG. 7, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for a adapter model module 730 that may be used to implement and/or emulate the systems and models, and/or to implement any of the methods described further herein. In some examples, the adapter model module 730, may receive an input 740, e.g., such as a question, via a data interface 715. The data interface 715 may be any of a user interface that receives a question, or a communication interface that may receive or retrieve a previously stored question from the database. The adapter model module 730 can interface with a language model module 750 and may generate an output 750, such as an answer to the input 740.

In one embodiment, memory 720 may store a language model and an adapter model described in FIG. 2. In another embodiment, processor 710 may access a knowledge base stored at a remote server via the communication interface 715.

In some embodiments, the adapter model module 730 may further include additional modules such as an LSTM, MLP, Max Pool Layer, BERT, and ORCALE (which is similar to the modules shown in FIGS. 1-7). The additional modules can receive a first embedding 103 shown in FIGS. 1-6 and generate a second embedding 105 shown in FIGS. 1-7.

In one implementation, the adapter model module 730 and its submodules may be implemented via software, hardware and/or a combination thereof.

Figure 8:
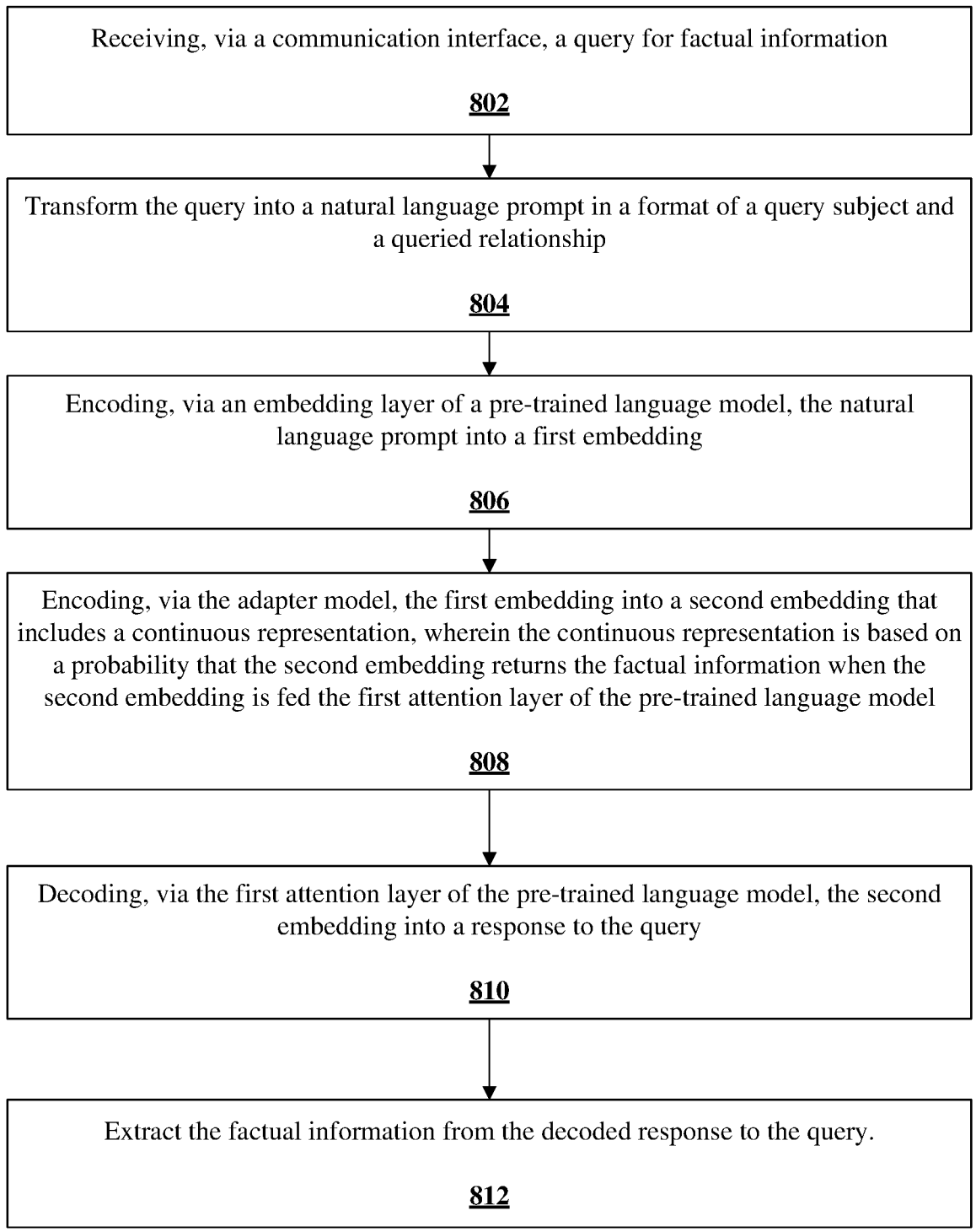
FIG. 8 is a simplified logic flow diagram illustrating an example process of training the framework in FIGS. 1-6 for factual information extraction from a language model, according to embodiments described herein.

Some examples of computing devices, such as computing device 700 may include non-transitory, tangible, machine readable media that include executable code that when run by one or more processors (e.g., processor 710) may cause the one or more processors to perform the processes of methods 800 discussed in relation to FIG. 8. Some common forms of machine readable media that may include the processes of methods 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Workflows

FIG. 8 is a simplified logic flow diagram illustrating an example process 800 of training an adapter model for extracting factual information from a pre-trained language model using the framework shown in FIGS. 1-6, according to embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the adapter model module 730 (FIG. 7) to perform the task of providing an answer to an input question.

At step 802, a query for factual information is received. For example, the question "The capital of America is" received via the communication interface (e.g., 715 in FIG. 7).

At step 804, the query is transformed into a natural language prompt in a format of a query subject and a queried relationship. In an example, the adapter model module (e.g., 730 in FIG. 7) may transform the query into a natural language prompt in a format of a query subject and a queried relationship.

At step 806, a first embedding is encoded. For example, the first embedding layer (e.g., 102 in FIG. 1) may encode the first embedding (e.g., 103 in FIG. 1) based on the pre-trained language model.

At step 806, a second embedding that includes a continuous representation is encoded. For example, the adapter model (e.g., 104 in FIG. 1) may encode the first embedding into a second embedding (e.g., 105 in FIG. 1). In an example, the adapter model, may determine a probability associated with each of the plurality of alternate embeddings returning the factual information when fed to the first attention layer of the pre-trained language model. The adapter model may determine, the second embedding based on the probability associated with each of the plurality of alternate embeddings At step 808, a response to the query is extracted via the first attention layer (e.g., 106 in FIG. 1) of the pre-trained language model.

At step 810, factual information is extracted from the decoded response to the query.

Example Performance

In example, the factual information extraction system described herein may be trained and tested on the entity pairs and relations from the T-Rex split of the LAMA dataset (described in In Proceedings of the 2019 Conference on Empirical Methods in Natural Language Processing and the 9 th International Joint Conference on Natural Language Processing (EMNLP-IJCNLP), pp. 2463-2473, Hong Kong, China, November 2019 hereinafter Petroni et al. 2019). In an example, the LAMA data includes 41 relations and approximately 1000 entity pairs for each relation sample from Wikidata. In an example, the system described herein may pool the templates from the LAMA, LPAQA, and ParaRel datasets (described in Jiang et al., 2020, How Can We Know What Language Models Know? Transactions of the Association for Computational Linguistics, 2020. ISSN 2307-387X, and Elazar et al., 2021, Measuring and improving consistency in pretrained language models, arXiv preprint arXiv:2102.01017, 2021). In an example, the LPAQA data includes templates created automatically with a paraphrase model, mined from Wikipedia, and written by annotators, and ParaRel contains high-quality human-written templates. In an example, the system described herein may use data from the BERT lexical substitution system from (Lee et al. 2021, In Proceedings of the 2021 Conference of the North American Chapter of the Association for Computational Linguistics: Human Language Technologies, pp. 4362-4379, Online, June 2021. Association for Computational Linguistics. to augment the pool of ParaRel templates. In an example, the augmenting the pool of ParaRel templates provides an average 81.4 prompt templates per relation.

In an example, for training and validation the system described herein may use the entity pairs from the training and validation splits of (Shin et al. 2020, In Proceedings of the 2020 Conference on Empirical Methods in Natural Language Processing (EMNLP), pp. 4222-4235, Online, November 2020.) In an example, the system described herein can divide the data randomly such that the templates are into two groups: one for training and one for OOD natural language prompt evaluation.

In an example, to test extracting factual knowledge and to avoid overfitting to training templates or entity pair distributions, evaluations may be performed in four different settings. In the first setting is based on ID templates and objects. In an example, the entity pairs from the LAMA dataset and the training templates may be used. In an example, the entity pairs are different from what was seen at training-time, but their objects are from the same distribution, i.e., the distribution of objects in Wikidata.

In the second setting, the OOD natural language prompts (OOD Prompts) are used. In an example, the second setting tests whether the P-Adapters according to an embodiment described herein generate effective continuous prompts for novel templates. In an example, the same entity pairs may be used as in the ID evaluation, but the templates that were not used to train the P-Adpater may be used for ID evaluation.

In the third setting, an OOD distribution of objects (OOD Objects) may be used. In an example, this setting tests whether the P-Adapter models learn to match the distribution of objects in the training set rather than predict arbitrary object entities. In an example, to evaluate whether the P-adapter learns to match the distribution the uniform-wikidata dataset from (Cao et al. 2021, In Proceedings of the 59 th Annual Meeting of the Association for Computational Linguistics and the 11 th International Joint Conference on Natural Language Processing (Volume 1: Long Papers, pp, 1860-1874) may be used. In an example, the dataset is constructed such that each object appears the same number of times for each relation. In an example, the ID evaluation set may contain a more uneven distribution of objects from Wikidata.

In the fourth setting, the test is based on templates with typographic errors (OOD Keyboard Errors). In an example, this setting assesses the robustness of the P-Adapters to potential typos in the natural language prompts. In an example, the entity pairs and the templates from the ID evaluation may be used. In an example, at least one typographic error in each template may be introduced using the nlpaug package (Ma 2019, Fantastically ordered prompts and where to find them: Overcoming few-shot prompt order sensitivity. arXiv preprint arXiv:2104.08786, 2021).

In an example, the system may evaluate two metrics. For example, the system 100 may evaluate precision@1 (P@1) and consistency.P@1. These two measures are a stringent measure of whether a prompt can extract a fact. In an example, the precision is defined as the proportion of prompts where the correct object is the top prediction of the language model such as a Large Language model. In an example, consistency measures whether a predictions of a model for a given entity pair matches across the different prompts, e.g., x' that contains the entities.

In an example, the system 100 calculates the consistency using the method from (Elazar et al. 2021, Measuring and improving consistency in pretrained language models. arXiv preprint arXiv:2102.01017, 2021). In an example, the consistency of knowledge of a fact is the proportion of pairs of prompts for the fact where the model makes the same prediction.

In an example, given a set of unordered pairs of prompts with the same entity pair, X', where there are n unique prompts, and representation $$v(x') = \arg\max_{v \in \mathcal{V}} P_{LM}(v | f_{prompt}(e(x')))$$

returns the model's top prediction given a natural language prompt x'. In an example, the consistency is defined as:

$$\text{consistency} = \frac{\sum_{(x'_i, x'_j) \in X'} \mathbb{1}[v(x'_i) = v(x'_j)]}{\frac{1}{2}n(n-1)}$$

In an example, a model may be consistent but is not accurate (e.g., by always predicting the same incorrect object).

FIG. 9 is an illustration of the main results for BERT Base in Table 1. In an example, the results for precision and consistency in an example embodiment described herein for a language model such as the BERT Large and RoBERTA Large. In an example, the BERT Large and RoBERTA large show similar trends. In an example, across evaluation settings, an embodiment of the adapter model identifies optimized prompts that lead to higher precision than natural language ones, which is evident from the low performance of the baseline in Table 1 in FIG. 9.

In an example, based on a comparison of the different evaluation settings, the an embodiment described herein determines the following results. First, the OOD Objects test is the most challenging setting, on average, with 20.41% lower precision than the ID setting. In an example, this setting is challenging even for the oracle. In an example, the models in accordance with an embodiment of the invention performed similarly on the OOD Prompts as they did on the in domain ones. In an example, this result is not opposite to finding that the prompt has a large impact on performance (Jiang et al. 2020. How Can We Know What Language Models Know? Transactions of the Association for Computational Linguistics, 8: 423-438,07 2020. ISSN 2307-387X. doi: 10.1162 tacl_a_00324. URL https://doi. Org/10.1162/tacl_a_00324), based on the claims displaying about average prompt performance rather than individual prompt performance.

In an example, the precision of an embodiment of the adapter model has a higher ID when compared with OOD, particularly for the MoE model. In an example, an embodiment of the adapter model outperforms the baseline. Therefore, the embodiment of the adapter model may be trained to learn useful information for the OOD natural language prompts.

In an example, an embodiment of the adapter model described herein was tested on the OOD Keyboard Errors. In an example, the embodiment of the adapter model described herein outperforms the baseline. In an embodiment of adapter model described herein, the precision on the corrupted prompts is lower than the uncorrupted ones, and drops by a larger absolute percentage than the baseline.

In an embodiment of the adapter model described herein the results in variation types may be being more consistent in the predictions. As shown in FIG. 9, the consistencies dramatically increase from less than 0.2 for the baseline to over 0.4 in Table 1. In an example, the adapter model was consistent on the OOD Keyboard Errors, consistent between the OOD Prompts and OOD Objects evaluations. In an example, the embodiment of the adapter model such as the oracle has a perfect consistency of 1.0, because it uses the same continuous prompt for all facts with the same relation, so the predictions for that fact are the same.

In an example, the embodiment of the adapter model such as the MoE model has a high consistency for a similar reason. In an embodiment of the adapter model, when the classifier predicts two prompts for the same entity pair come from the same relation, the predictions will be the same, and therefore consistent. In an example, the P-Tuning P-Adapter has a high consistency. In an example, with respect to the P Tuning P-Adapter, the main factor driving the prediction of the adapter model may be the subject of the entity pair, because the unmodified embedding of the subject is shared among the prompts for the same object.

In an embodiment, of the adapter model providing in the output embedding access to the embeddings of the natural language prompt as input to the first attention layer of the language model improved the consistency and precision. For example, the Prefix P-Adapter and the P-Tuning P-Adapter, which have access to some unmodified language model embeddings, achieve higher precisions than the Rewrite P-Adapter, which alters the language model embeddings.

In an embodiment of the adapter model, the [MASK] token embedding has to remain unmodified, and the Rewrite PAdapter performs poorly because it corrupts this embedding. In an example, first the model adapter such as a version of the Rewrite P-Adapter that replaces the P-Adapter's output in the [MASK] token position with the LLM's [MASK] token embedding was trained. In an example of an embodiment of the adapter model a version of the P-Tuning P-Adapter whose output has the LLM's [MASK] embedding without the subject embedding was trained. In an example, these two methods of training and using the adapter model do not increase performance much compared to the Rewrite P-Adapter.

Figure 10:
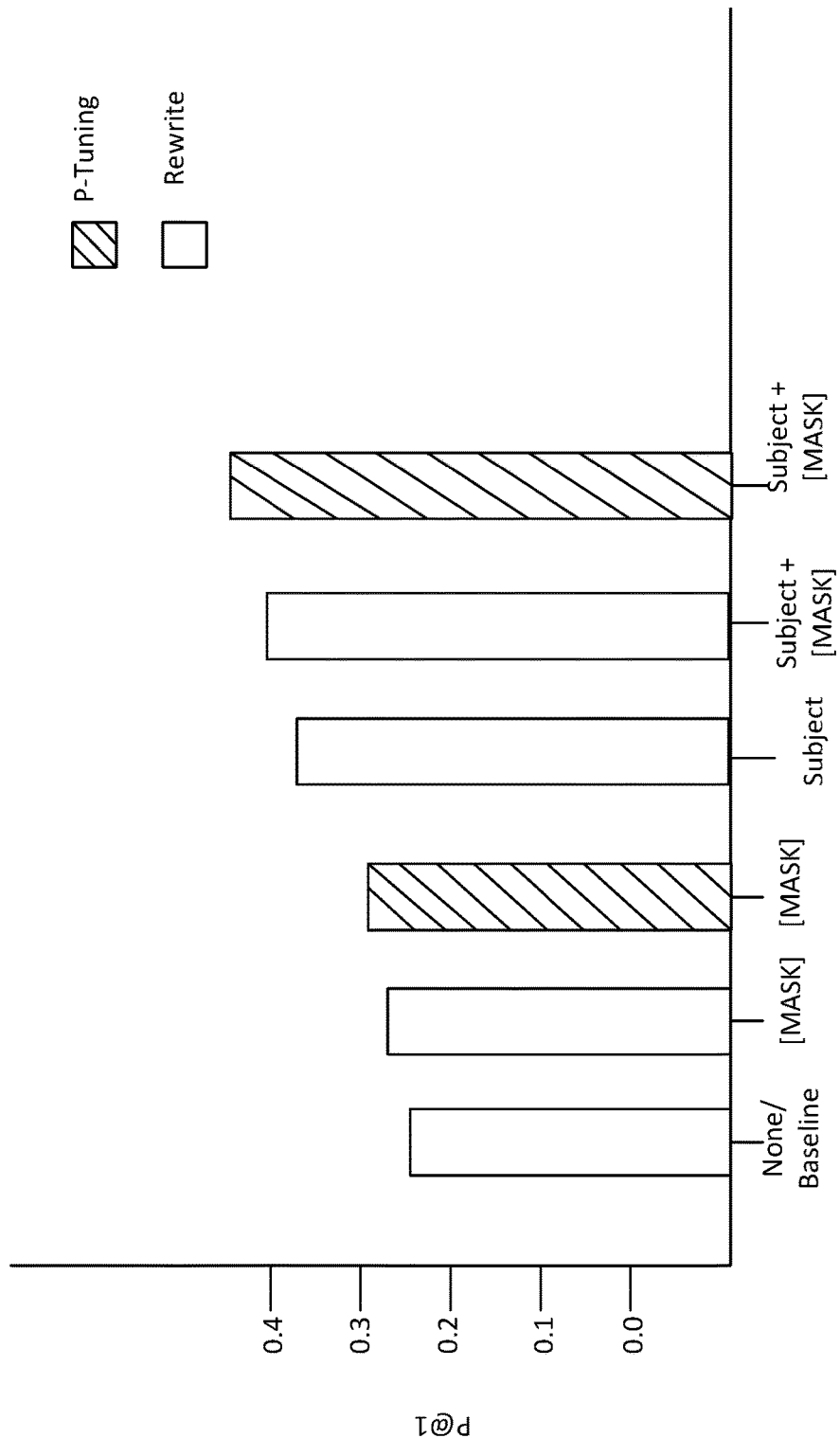
Figure 11:
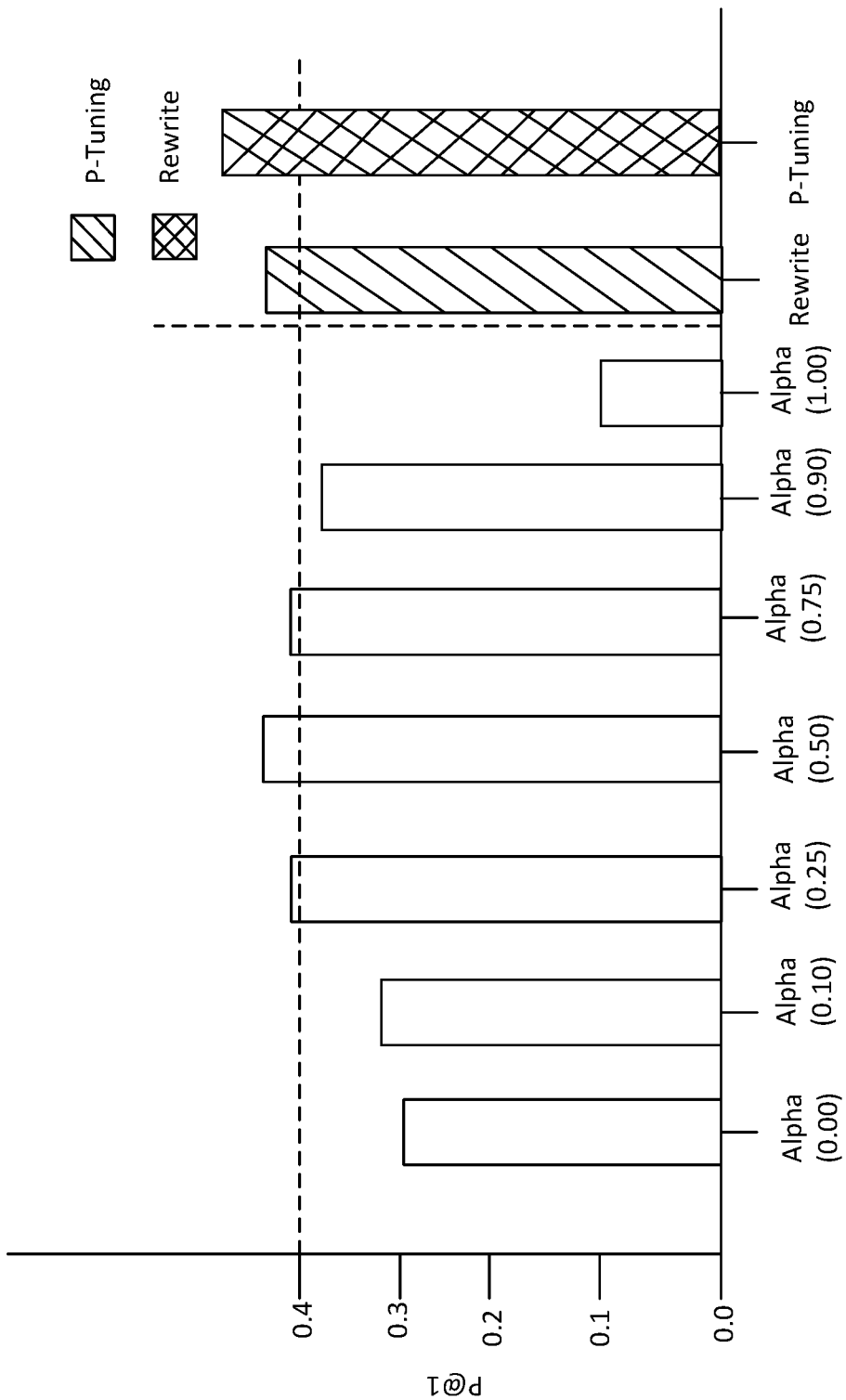

With reference to FIGS. 10 and 11 in an embodiment of the adapter model the subject embeddings are unmodified, and the Rewrite P-Adapter corrupts the subject, which leads to lower precision. In an example, to optimize the adapter model, the system trains a version of the Rewrite P-Adapter model that replaces the embeddings for the subject in the P-Adapter output with the LLM's embeddings for the subject. In an example, of the current adapter model, replacing the embeddings for the subject in the P-adapter output is more effective compared to baseline, and increases precision by 13%.

For example, in an embodiment of the adapter model where the P-Tuning P-Adapter, keeps the subject and [MASK] embeddings the same, the system also trains a version of the Rewrite P-Adapter that replaces the embeddings at both the subject and [MASK] token positions with the LLM's embeddings. In this embodiment, the adapter model performs 4% worse than the P-Tuning P-Adapter. With reference to FIG. 11, in an embodiment of the adapter model the subject token as part of the prompt improves consistency and precision. In an example, the Prefix P-Adapter performs well because it has access to the LLM's embeddings for the entire natural language prompt, which includes the subject.

In an embodiment of the adapter model, changes to the Rewrite P-Adapter models may improve the results based on a knowledge of the index of the subject tokens at training and inference time. In an embodiment of the adapter model the system can train using extra annotations. In an embodiment, of the adapter model, to incorporate the unmodified embeddings of the natural language prompt of the language model into the output of the P-Adapter, the system may interpolate between the P-Adapter output and the unmodified embeddings. In an example, the system may train a third type of Rewrite P-Adapter. If $f_{rewrite-adapter}$ is the original Rewrite P-Adapter, the equation for the new Rewrite P-Adapter is:

$$f_{P-Adapter}(x') = \alpha e(x') + (1-\alpha) f_{rewrite-adapter}(e(x'))$$

where $\alpha$ is a hyperparameter, when $\alpha=0$, this P-Adapter is equivalent to the original Rewrite P-Adapter, and when $\alpha=1$ it is equivalent to the baseline. In an embodiment, of the adapter model such that $\alpha \varepsilon \{0.1, 0.25, 0.5, 0.75, 0.9\}$, the adapter model with $\alpha=0.5$ may perform the better than the other adapter models. In an example, the adapter model with $\alpha=0.5$ may perform better than the Rewrite P-Adapter when the subject and [MASK] tokens are substituted as shown in FIG. 11.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for extracting factual information from a language model, the method comprising:
   receiving, via a communication interface, a query for factual information;
   encoding, via an embedding layer of a pre-trained language model, the natural language prompt into a first embedding;
   encoding, via an adapter model the first embedding into a second embedding that includes a continuous representation based on a probability that the second embedding will return the factual information when the second embedding is fed to a first attention layer of the pre-trained language model, wherein the adapter model is placed between the embedding layer of the pre-trained language model and a first attention layer of the pre-trained language model;
   decoding, via the first attention layer of the pre-trained language model, the second embedding into a response to the query; and
   extracting the factual information from the decoded response to the query.

2. The method of claim 1, wherein encoding, via the adapter model, the first embedding into a second embedding comprises;
   determining, via an LSTM (Long Short Term Memory) layer, an LSTM encoding in response to the first embedding; and
   determining, via a Multi-Layer Perceptron (MLP), the second embedding in response to the LSTM encoding.

3. The method of claim 1, wherein encoding, via the adapter model, the first embedding into a second embedding comprises;
   determining, via an LSTM (Long Short Term Memory) layer, an LSTM encoding based on the first embedding;
   down-sampling the LSTM output, via a pooling layer; and
   determining, via a Multi-Layer Perceptron (MLP), a part of the second embedding based on the down-sampled LSTM encoding.

4. The method of claim 3, further comprising;
   transmitting the first embedding as part of the second embedding to the first attention layer.

5. The method of claim 1, wherein encoding, via the adapter model, the first embedding into a second embedding comprises:
   determining a first entity and a second entity in the first embedding;
   determining, via a classifier, a relationship between the first entity and the second entity; and
   determining, via a look-up table, the second embedding associated with the relationship.

6. The method of claim 1, wherein encoding, via the adapter model, the first embedding into a second embedding comprises;
   determining a first entity and a second entity in the first embedding;

determining, via an oracle model, a relationship between the first entity and the second entity, wherein the oracle model returns a relationship given the first entity and the second entity; and determining, via a look-up table, the second embedding associated with the relationship.

7. The method of claim 1, wherein encoding, via the adapter model, the first embedding into a second embedding comprises:

determining, via the adapter model, a plurality of alternate embeddings based on the first embedding;

determining, via the adapter model, a probability associated with each of the plurality of alternate embeddings returning the factual information when fed to the first attention layer of the pre-trained language model; and determining, via the adapter model, the second embedding based on the probability associated with each of the plurality of alternate embeddings.

8. The method of claim 1, wherein encoding, via the adapter model, the first embedding into a second embedding comprises:

determining a first entity and a mask in the first embedding;

determining, via the adapter model, a plurality of alternate embeddings based on the position of the first entity and the mask;

determining, via the adapter model, a probability associated with each of the plurality of alternate embeddings returning the factual information when fed to the first attention layer of the pre-trained language model; and determining, via the adapter model, the second embedding based on the probability associated with each of the plurality of alternate embeddings.

9. The method of claim 1, further comprising:

receiving, via a communication interface, a training data set, the training dataset including a plurality of sets of similar natural language queries for factual information;

determining a first entity and a second entity in each query in a set of similar natural language queries from the plurality of sets of similar natural language queries;

masking at least the first entity or the second entity in each query in the set of similar natural language queries;

determining a masked embedding for each masked query in the set of similar natural language queries;

determining a response to each masked embedding via the pre-trained language model, via the first attention layer of the pre-trained language model;

determining whether the response matches the masked entity in the natural language query;

determine a probability that a masked embedding will return the response that matches the masked entity in the natural language query; and update an adapter model that chooses a query where the response from the pre-defined language model matches the masked entity based on the determined probability.

10. A system for extracting factual information from a language model, the system comprising:

a communication interface for receiving a query for factual information;

a memory storing a plurality of machine readable instructions; and a processor reading and executing the instructions from the memory to perform operations comprising:

receive, via the communication interface, a query for factual information;

transform the query into a natural language prompt in a format of a query subject and a queried relation;

encode, via an embedding layer of a pre-trained language model, the natural language prompt into a first embedding;

encode, via the adapter model, the first embedding into a second embedding based on a probability that the second embedding returns the factual information when the second embedding is fed the first attention layer of the pre-trained language model;

decode, by the first attention layer of the pre-trained language mode, the second embedding into a response to the query; and extract the factual information from the decoded response to the query.

11. The system of claim 10, wherein the operation of encoding, via the adapter model, the first embedding into a second embedding comprises:

determine, via an LSTM (Long Short Term Memory) layer, an LSTM encoding based on the first embedding; and determine, via a Multi-Layer Perceptron (MLP), the second embedding based on the LSTM encoding.

12. The system of claim 10, wherein the operation of encoding, via the adapter model, the first embedding into a second embedding comprises:

determine, via an LSTM layer, an LSTM encoding based on the first embedding;

down-sample the LSTM output, via a pooling layer; and determine, via a Multi-Layer Perceptron (MLP), a part of the second embedding based on the down-sampled LSTM encoding.

13. The system of claim 12, wherein the operation of encoding, via the adapter model, the first embedding into a second embedding comprises:

transmit the first embedding as part of the second embedding to the first attention layer.

14. The system of claim 10, wherein the operation of encoding, via the adapter model, the first embedding into a second embedding comprises:

determine a first entity and a second entity in the first embedding;

determine, via a classifier, a relationship between the first entity and the second; and determine, via a look-up table, the second embedding associated with the relationship.

15. The system of claim 10, wherein the operation of encoding, via the adapter model, the first embedding into a second embedding comprises:

determine a first entity and a second entity in the first embedding;

determine, via an oracle model, a relationship between the first entity and the second entity, wherein the oracle model returns a relationship given the first entity and the second entity; and determine, via a look-up table, the second embedding associated with the relationship.

16. The system of claim 10, wherein the operation of encoding, via the adapter model, the first embedding into a second embedding comprises: determining, via the adapter model, a plurality of alternate embeddings based on the first embedding;

determine, via the adapter model, a probability associated with each of the plurality of alternate embeddings returning the factual information when fed to the first attention layer of the pre-trained language model; and determine, via the adapter model, the second embedding based on the probability associated with each of the plurality of alternate embeddings.

17. The system of claim 10, wherein the operation of encoding, via the adapter model, the first embedding into a second embedding comprises:
   determine a first entity and a mask in the first embedding;
   determine, via the adapter model, a plurality of alternate embeddings based on the position of the first entity and the mask;
   determine, via the adapter model, a probability associated with each of the plurality of alternate embeddings returning the factual information when fed to the first attention layer of the pre-trained language model; and
   determine, via the adapter model, the second embedding based on the probability associated with each of the plurality of alternate embeddings.

18. The system of claim 10, wherein the processor performs operations comprising:
   receive, via a communication interface, a training data set, the training dataset including a plurality of sets of similar natural language queries for factual information;
   determine a first entity and a second entity in each query in a set of similar natural language queries from the plurality of sets of similar natural language queries;
   generate a mask for at least the first entity or the second entity in each query in the set of similar natural language queries;
   determine a masked embedding for each masked query in the set of similar natural language queries;
   determine a response to each masked embedding via the pre-trained language model, via the first attention layer of the pre-trained language model;
   determine whether the response matches the masked entity in the natural language query;
   determine a probability that a masked embedding will return the response that matches the masked entity in the natural language query; and
   update an adapter model that chooses a query where the response from the pre-defined language model matches the masked entity based on the determined probability.

19. A processor-readable non-transitory storage medium storing a plurality of processor-executable instructions for extracting factual information from a language model, the instructions being executed by one or more processors to perform operations comprising:
   receiving, via a communication interface, a query for factual information;
   transforming the query into a natural language prompt in a format of a query subject and a queried relation;
   encoding, via an embedding layer of a pre-trained language model, the natural language prompt into a first embedding;
   encoding, via an adapter model, the first embedding into a second embedding based on a probability that the second embedding returns the factual information when the second embedding is fed the first attention layer of the pre-trained language model, wherein the adapter model is placed between the embedding layer of the pre-trained language model and the first embedding layer of the pre-trained language model;
   decoding, by the first attention layer of the pre-trained language mode, the second embedding into a response to the query; and
   extracting the factual information from the decoded response to the query.

20. A processor-readable non-transitory storage medium storing a plurality of processor-executable instructions for extracting factual information from a language model, of claim 19, the instructions being executed by one or more processors to perform operations comprising:
   determining, via an LSTM (Long Short Term Memory) layer, an LSTM encoding based on the first embedding; and
   determining, via a Multi-Layer Perceptron (MLP), the second embedding based on the LSTM encoding.

* * * * *